Oct. 26, 1954  S. E. HILL  2,692,506
BEARING AND DRIVE MEANS FOR VEHICLES
Filed Feb. 11, 1950  9 Sheets-Sheet 1

Inventor
Stanley E. Hill
By
Attorneys

Oct. 26, 1954 S. E. HILL 2,692,506
BEARING AND DRIVE MEANS FOR VEHICLES
Filed Feb. 11, 1950 9 Sheets-Sheet 2

Inventor
Stanley E. Hill
By
Attorneys

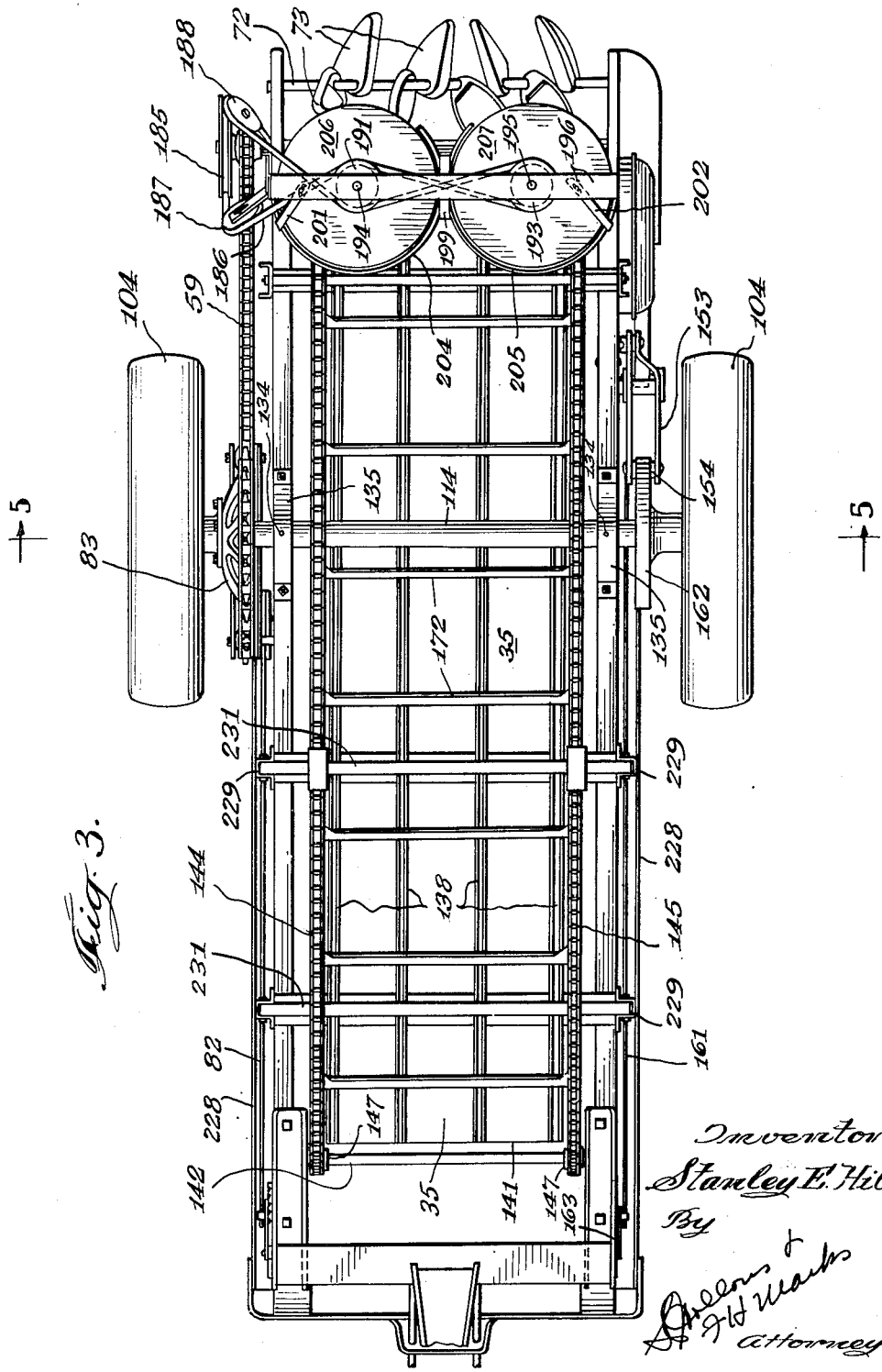

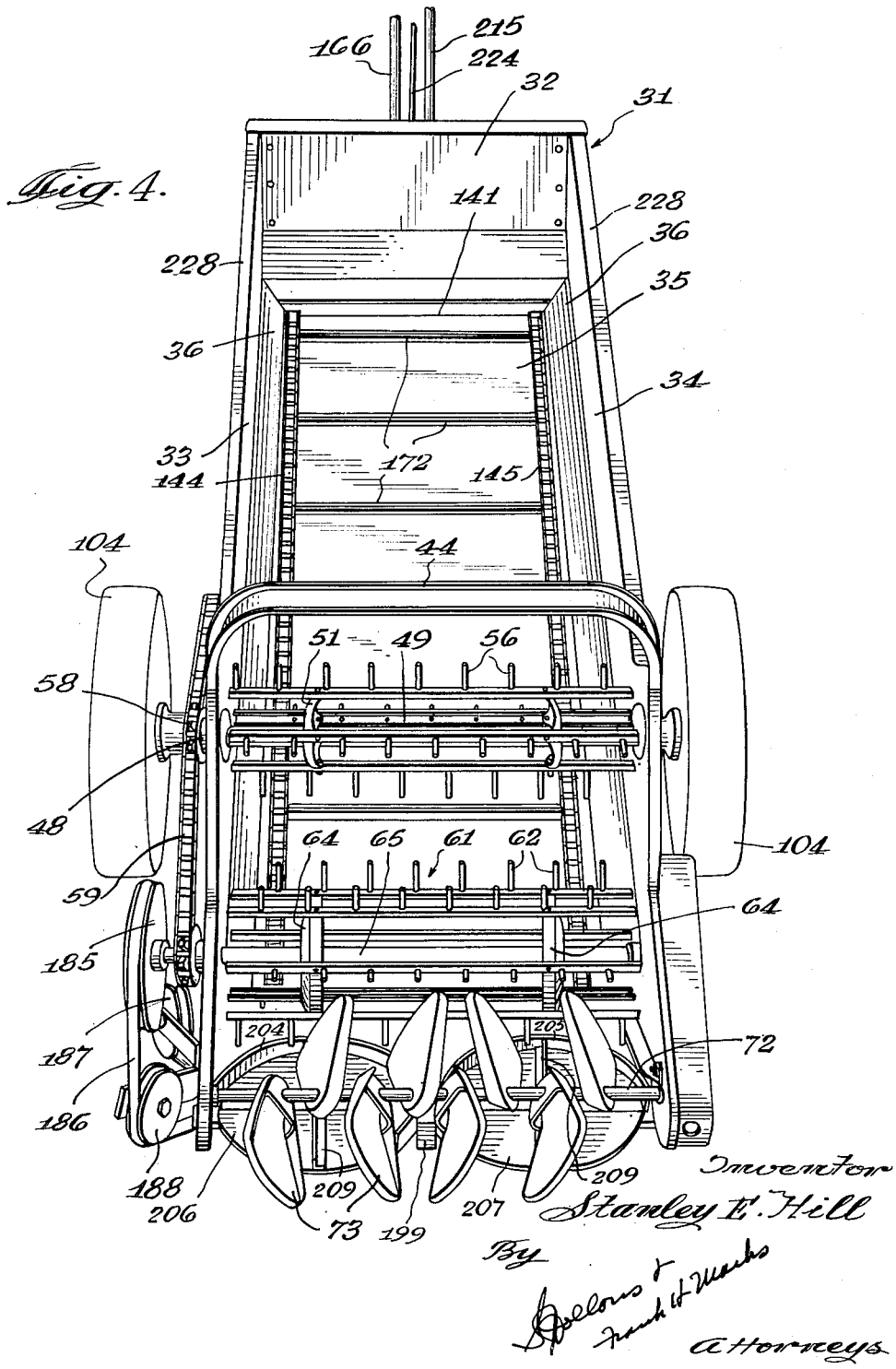

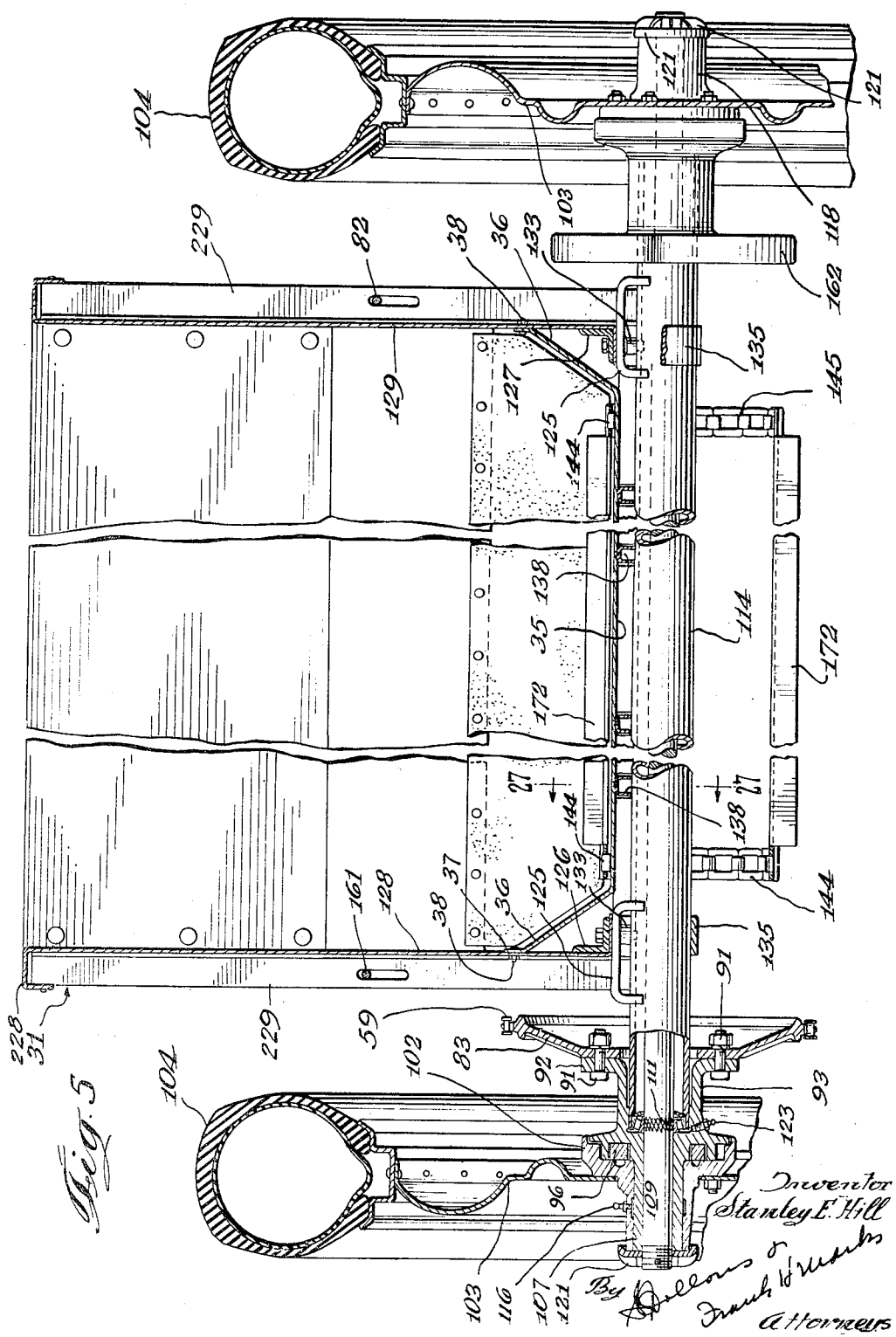

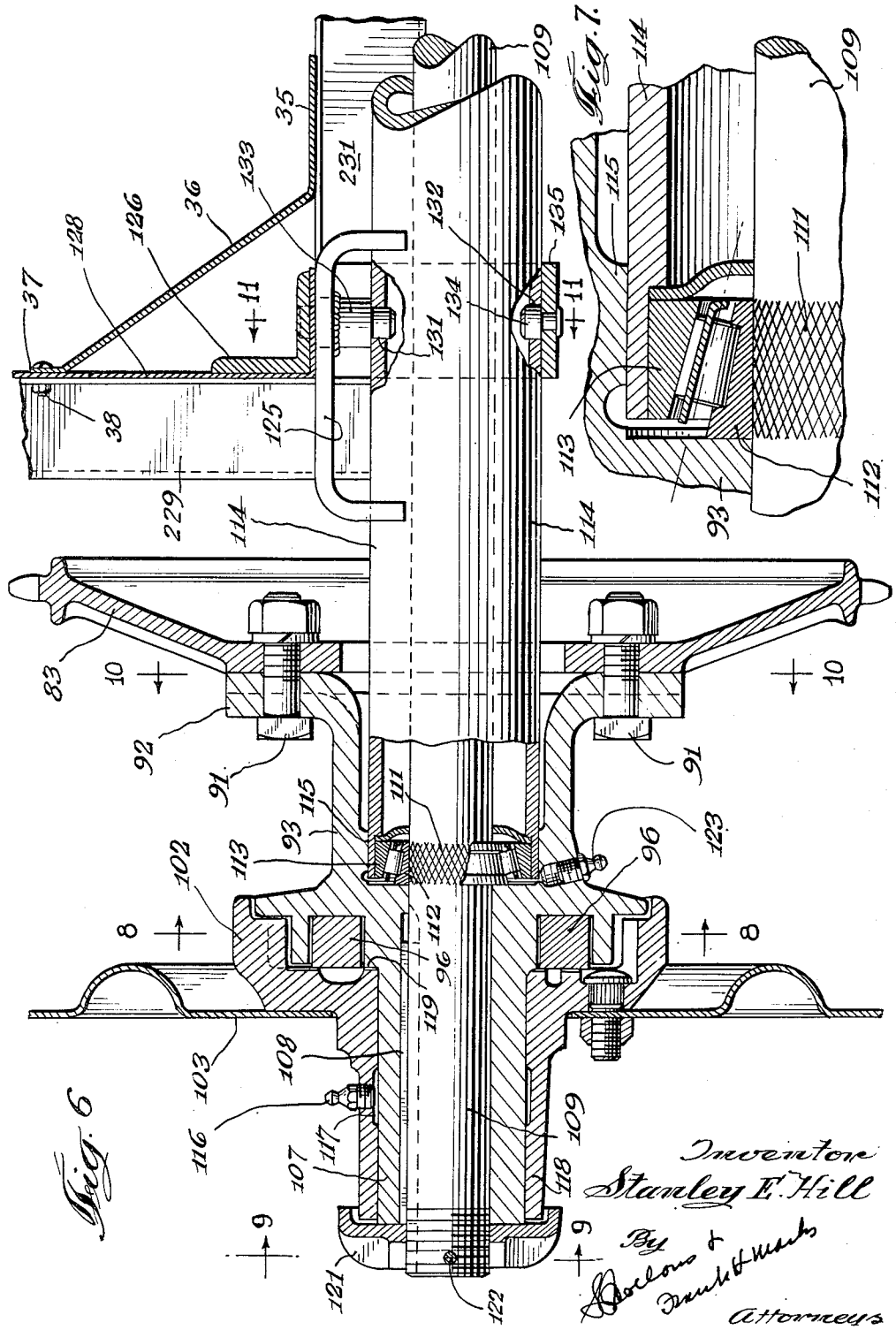

Oct. 26, 1954  S. E. HILL  2,692,506
BEARING AND DRIVE MEANS FOR VEHICLES
Filed Feb. 11, 1950  9 Sheets-Sheet 7
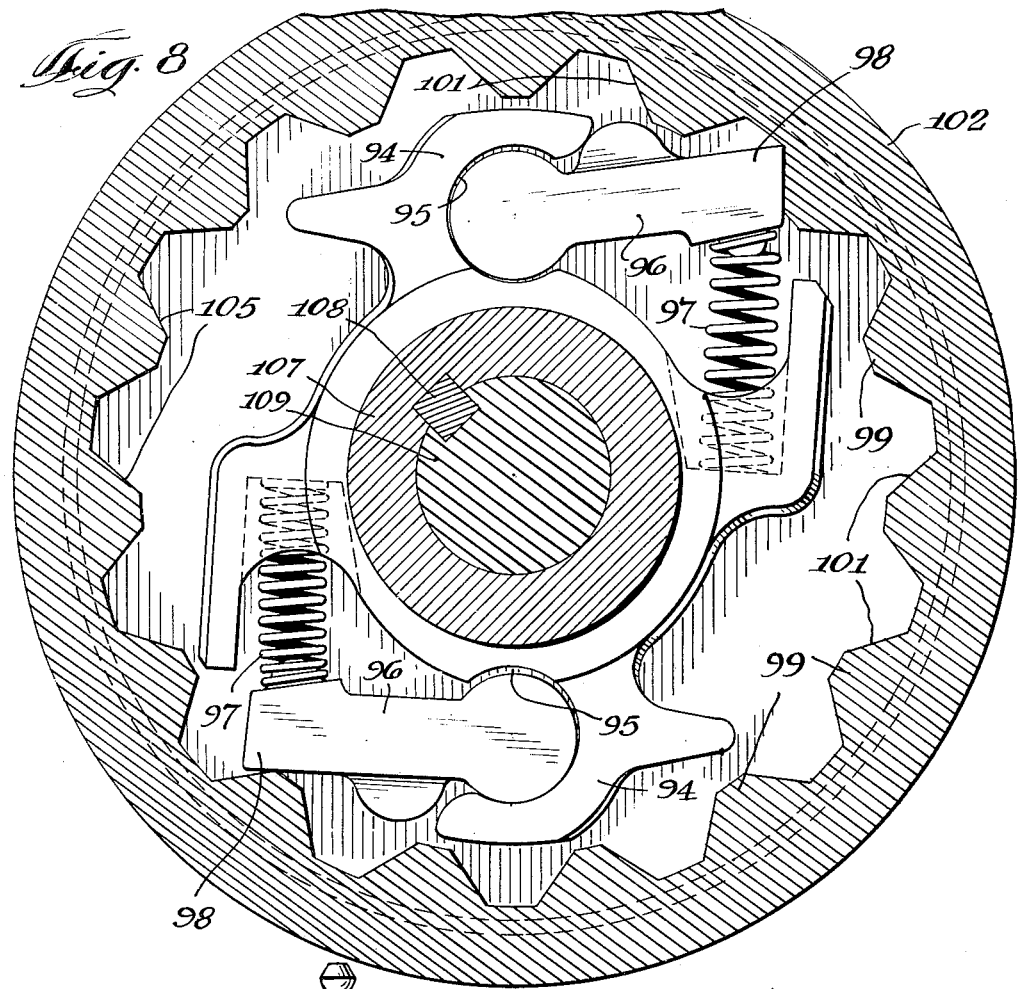
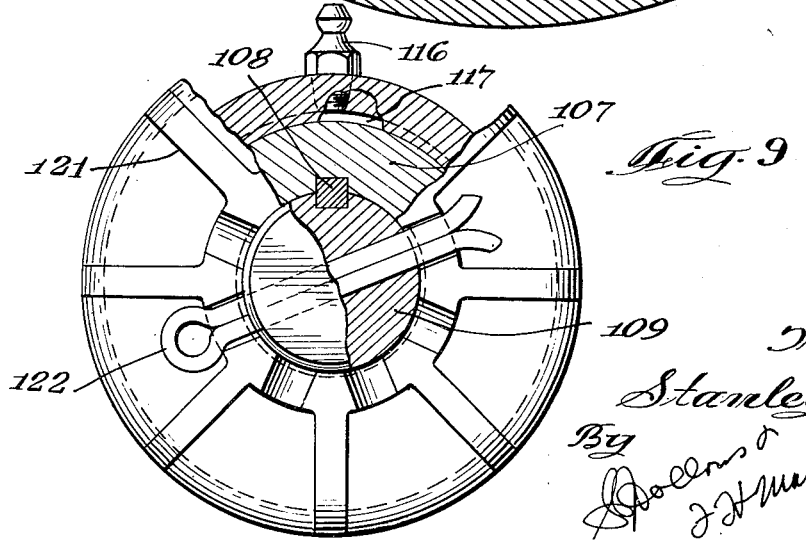
Inventor
Stanley E. Hill
By
Attorneys Oct. 26, 1954     S. E. HILL     2,692,506
BEARING AND DRIVE MEANS FOR VEHICLES
Filed Feb. 11, 1950     9 Sheets-Sheet 8
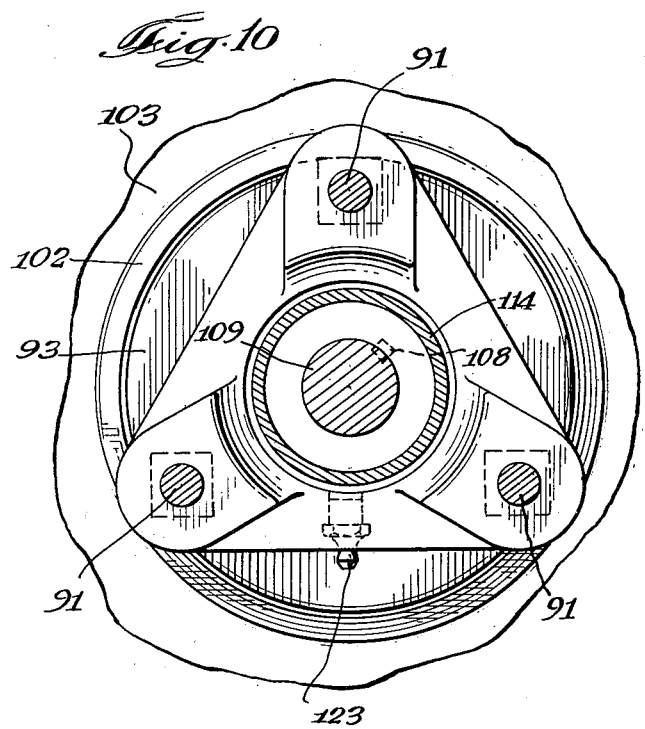
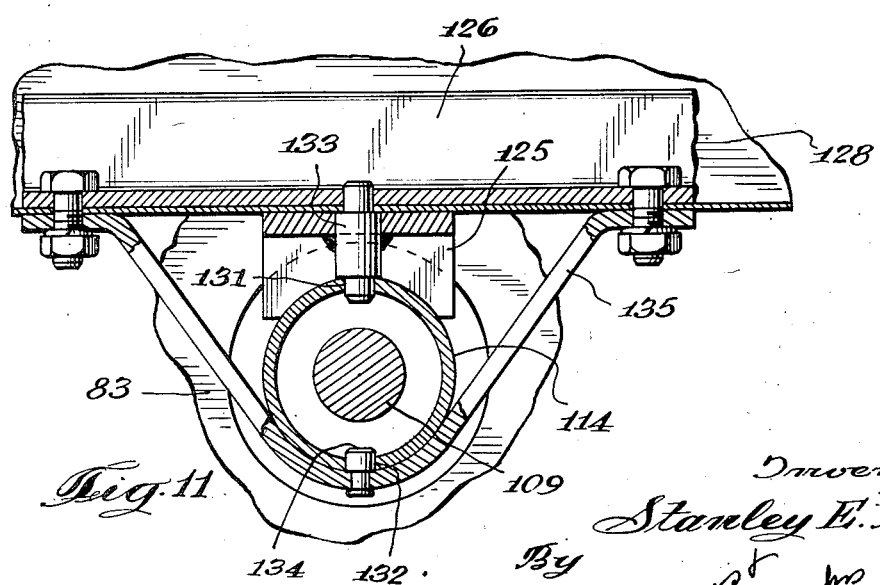
Inventor
Stanley E. Hill
By
Attorneys

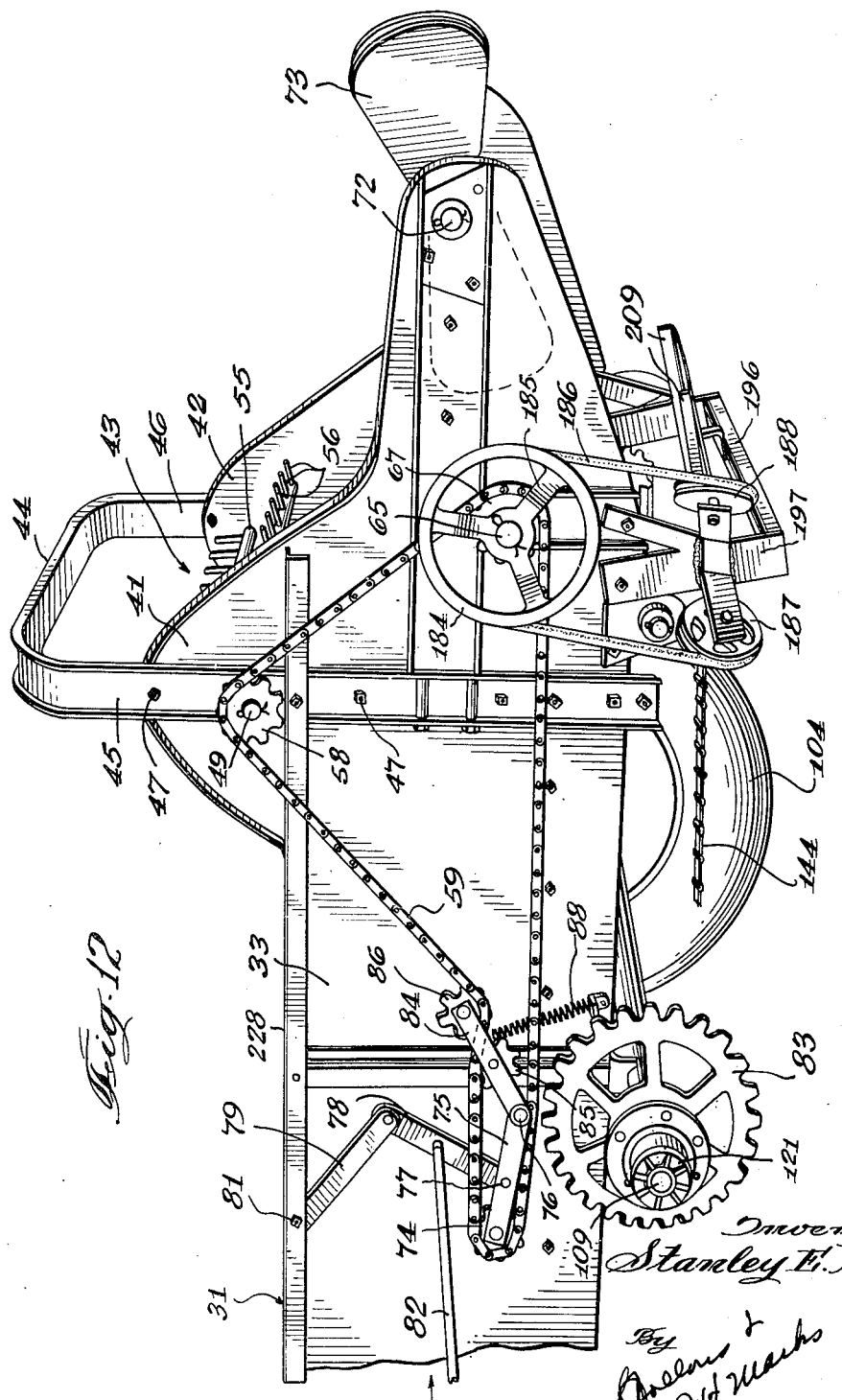

Patented Oct. 26, 1954

2,692,506

UNITED STATES PATENT OFFICE 2,692,506

BEARING AND DRIVE MEANS FOR VEHICLES

Stanley E. Hill, Kankakee, Ill., assignor to Sears, Roebuck and Co., Chicago, Ill., a corporation of New York Application February 11, 1950, Serial No. 143,705

3 Claims. (Cl. 74—13)

1

The present invention relates to farm vehicles generally and more particularly to bearing and drive means for such a vehicle.

The principal object of the present invention is the provision in a traction-powered vehicle of improved bearing and drive means adapted to be adjustable to compensate for the wear of the parts thereof.

With this and other objects in view, attention will now be given to the various structural details which all and singular combine to accomplish the foregoing and other objects as will be revealed hereinafter. In connection with the detailed explanation which is to follow, attention will be directed to the accompanying drawings in which like reference numerals designate corresponding parts throughout and in which:

Fig. 3 is an inverted plan view of the same apparatus.

Fig. 4 is a perspective view looking downward from a rearmost angle.

Fig. 5 is an enlarged transverse sectional view taken approximately on line 5—5 of Fig. 3.

Fig. 6 is an enlarged detailed sectional view of one end of the principal axle on which is carried the drive sprocket.

Fig. 7 is a fragmentary enlarged sectional view which features the beam tube journal support of the principal axle.

Fig. 8 is an enlarged detailed sectional view taken approximately on line 8—8 of Fig. 6.

Fig. 9 is an enlarged end elevational view of the axle hub cab as viewed from line 9—9 on Fig. 6 with the portions broken away to reveal the axle assembly structure.

Fig. 10 is an enlarged detailed sectional view taken approximately on line 10—10 of Fig. 6.

Fig. 11 is an enlarged detailed sectional view taken approximately on line 11—11 of Fig. 6.

Fig. 12 is a slightly enlarged side elevational view of the left hand side of the vehicle showing portions of the chain and belt driven power train.

Figure 1:
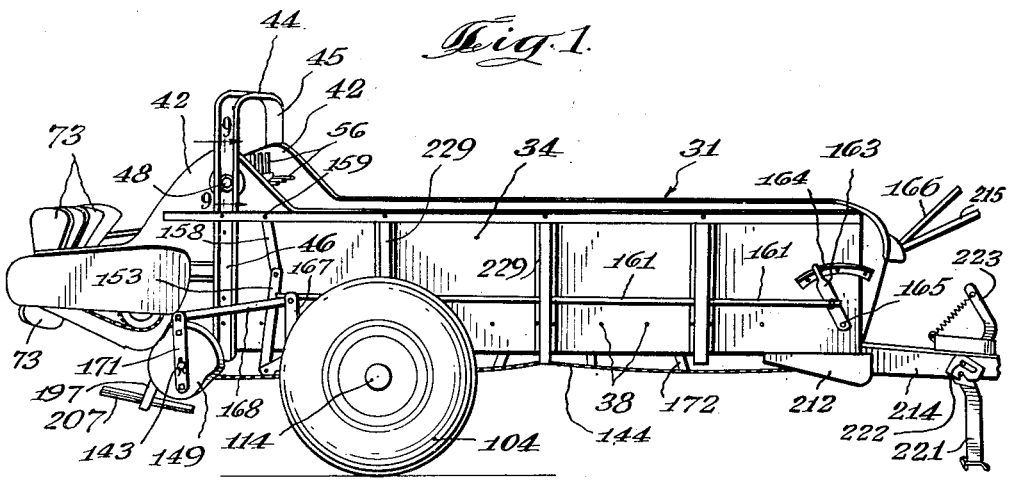
Fig. 1 is a side elevational view of a farm vehicle, for example, a manure spreader in which have been embodied the features of the present invention.

In the drawings the reference numeral 31 designates generally a wagon body preferably fabricated of sheet metal and comprised essentially of a forward wall section 32, a left side wall section 33, a right side wall section 34 and a floor panel 35 whose side edges are angularly bent as at 36 terminating with the upstanding securement flanges 37 which may be bolted as at 38 or riveted at spaced intervals to the side wall sections.

The two body side wall sections 33 and 34 are profiled in a characteristic manner so as to afford symmetrically opposite hump portions 41 and 42 in the rearward region. In order to afford additional rigidity at this point both to the humps 41 and 42 as well as to the functional mechanism which is journaled in this region, there may be provided an inverted U-shaped yoke channel 44 whose sides 45 and 46 are bolted to the side frames 33 and 34. In addition, the side sections of this yoke may carry the journal collars 48 in which rotate the primary beater assembly 43 which consists of a shaft 49 journaled at its ends in the bearings or collars 48 on which are welded a pair of drum disks 51. At one end the shaft 49 ends abruptly with a cotter retainer pin but at the opposite end this shaft carries a sprocket wheel 58 (see Fig. 12) which meshes with the links of an endless belt chain 59 whereby rotation is imparted to the beater assembly 43 as well as to other components.

Figure 2:
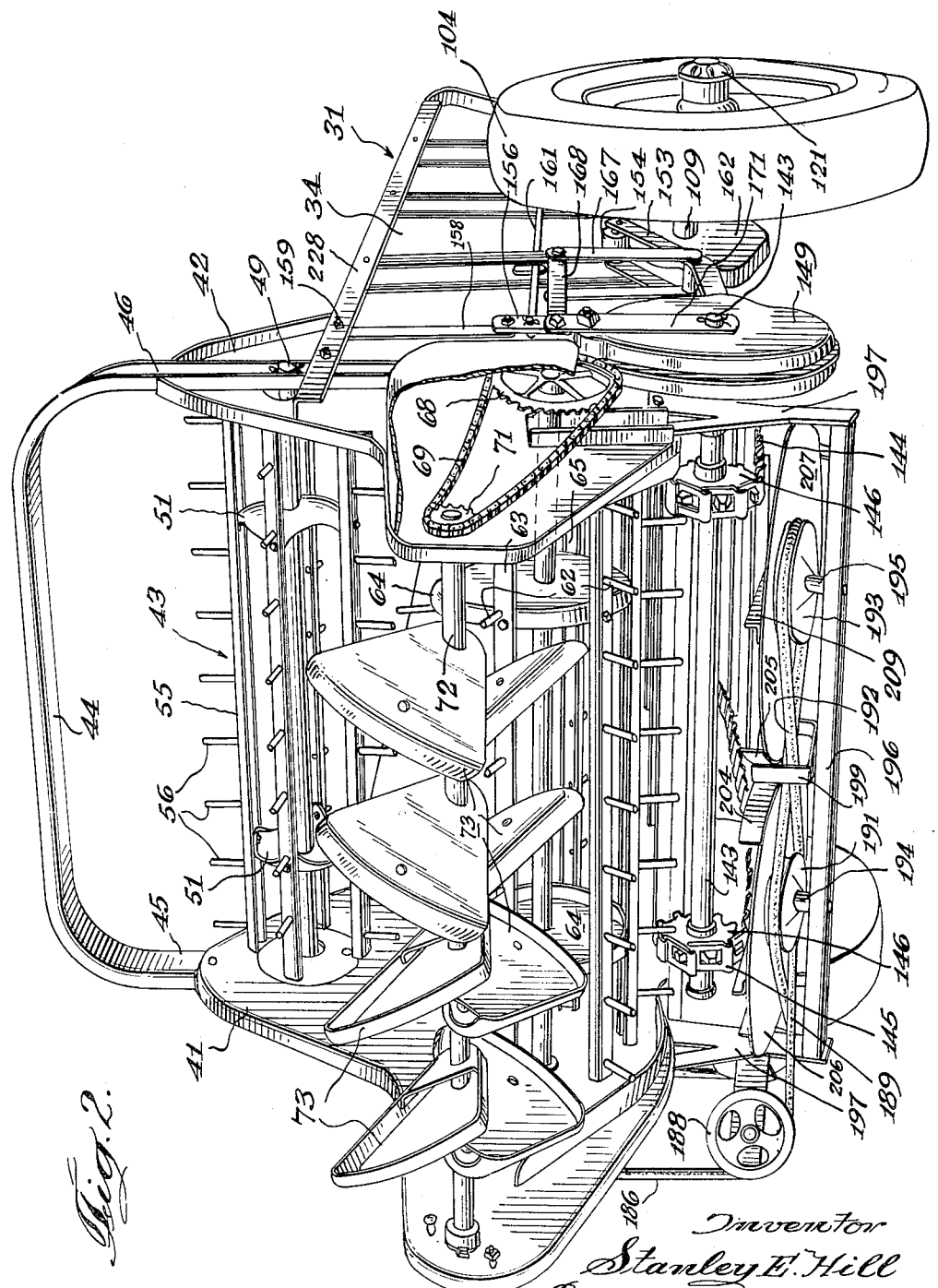
Fig. 2 is a slightly enlarged rear perspective view of the manure spreader featured in Fig. 1 with a portion of the drive mechanism case broken out to reveal the details of the power distribution system.

To the rear and slightly below the primary beater 43 just described is a secondary beater 61, Figs. 2 and 4, which is constructed generally similar to the beater 43 being provided with beater rods or fingers 62 carried by a longitudinal channel 63, the latter being supported on drum disks 64. In this case the principal shaft 65 extends through both of the side sections 33 and 34. Power for rotating shaft 65 is also derived from belt chain 59 which courses around the sprocket wheel 67 carried by shaft 65 imparting a similar direction of rotation to shaft 65 that it does to shaft 49. At the opposite end shaft 65 carries a driving gear 68 which meshes with the belt chain 69 which transmits a rotary motion to a driven pinion 71. The latter is carried on the end of shaft 72 on which are secured a distribution of rotatable paddles 73.

Referring now particularly to Fig. 5, attention is directed to the endless chain belt 59 which has already been described as meshing with the sprocket wheels 58 and 67 of shafts 48 and 65, respectively. This belt is disposed in a modified triangular arrangement encircling an idler sprocket 74 which is carried on the free end of a lever arm 75 stationarily pivoted at 76. At the mid-point 77 of arm 75 there is connected one end of a pair of toggle levers 78—79 hung at pivot 81 and capable of being actuated by a pull link 82. When the link is moved forward, that is to say, in the direction in which the vehicle travels, the toggle levers 78—79 are straightened out, forcing the horizontal flight of belt 59 into engagement with the teeth of a driving sprocket 83. On the other hand, when the link 82 is relaxed and permitted to recede under the influence of a spring 88 which will later be described, the toggle levers 78—79 fold towards each other raising the horizontal flight of belt 59 away from the teeth of sprocket 83.

Also pivoted at 76 is a slack take-up lever 84 which carries a pair of idler pinions 85 internal of the belt and 86 external thereof. The spring 88 urges arm 84 in a clockwise direction about its pivot 76 causing the idler pinions 85 and 86 to take up available slack when the clutch control toggles 78—79 are relaxed which is the condition shown in Fig. 5. On the other hand, during the engagement position when these clutch toggles are straightened out one with respect to the other, the spring 88 becomes distended as the idler pinions 85 and 86 rise to give length to the chain where it is required for engagement with sprocket 83.

The driving sprocket 83, see also Fig. 6, is bolted as at 91 to the flange 92 of a driven portion 93 of a tooth clutch, the details of which may be best ascertained from Fig. 8 where it may be observed to include a coupling head provided with a pair of opposed socket projections 94 that give journal at cylindrical apertures 95 to the clutch dogs 96. The latter constitute alternately acting interponents urged by the springs 97 to present their shouldered extremities 98 into the path of oncoming clutch teeth 99. The teeth 99 are strikingly obtuse in sectional formation, as will be understood from Fig. 8, but notwithstanding, their side surface 101 encountering squarely as they do the shoulders 98 of dogs 96 transmit a rotary motion which originates with the casting 102 carried integrally with the flanges 103 of the roller wheels 104, Fig. 3, and in the manner described, impart this rotation to the driven element 93 of the clutch combination 102—93.

The foregoing condition obtains provided that the forward motion of the vehicle imparts counterclockwise motion (Fig. 8) to the driving element 102 which causes the surfaces 101 to encounter squarely the shoulders 98. When the vehicle is backed causing the wheels 104 and the driving elements 102 to be rotated in a clockwise direction, the camming surfaces 105 encounter the tops of the coupling dogs 96 compressing their springs 97 whereupon the dogs 96 are made to describe successive clicking motions as they reciprocate between their depressed and elevated positions alternately. It will thus be seen that only the forward motion of the vehicle is made to give power to the principal belt 59, whereas backing motion of the vehicle is spent idly so far as the driving chain is concerned.

A secondary significance of the clutch drive mechanism is one which will be better observed by attention to Fig. 6. Here it will be noted that driven casting 93 is provided with a cylindrically extending sleeve 107 which is keyed as at 108 to the shaft 109. Near each of its ends as at 111 shaft 109 is knurled for the purpose of frictionally receiving the inner race 112 of a roller bearing assembly whose outer race 113 is drive fitted into a recessed end of a tubular housing 114.

Around the outer surface of the housing 114 which, for reasons which will now be explained, is preferably an accurately milled cylindrical member, there is provided a journal as at 115 formed of a flange ring or circle which is then machined to fit the milled member.

It is to be observed that in connection with shaft 109, which carries the brunt of the driving torque for the mechanism already described and for additional mechanism which is yet to be described and constitutes a comparatively lengthy member traversing the full width of the vehicle and extending substantially for idler wheel accommodations at both sides thereof, journaling provision is made in close vertical proximity to its wheel mount whereby is reduced to a minimum the transverse torsional strain and by extending the keying sleeve 107 outwardly as will be observed in Figs. 5 and 6, there is provided abundant feathering for securing the casting 93 to the shaft 109.

Minimization of bearing journals in farm implement design is an important accomplishment for the reason that such implements are to be spared as much as possible frequent servicing attention and lubrication. By making the outer bearing surface of sleeve 107 of ample length as has been done, there is provided adequate journal surfaces for carrying the hub and coupling casting 102. To lubricate this journal a pressure grease fitting 116 is provided communicating with a peripheral grease storage space 117.

The journal portion 118 of hub 102 is confined adjustably on the sleeve 107 between the shoulder 119 of member 93 and a screw threaded flange nut 121 which is preferably castellated as is clear from Fig. 9. Upon achieving a proper drawing up of the nut 121, it may be retained in position by the placement of cotter pin 122 through a hole in the shaft 109 and through an alignment of the castellated formation apertures.

Between the shoulder 119 and the confinement of nut 121 the journal portion 118 is given end thrust confinement as well as significant protection against grit and soil infiltration. The grease fitting 123 in member 93 provides lubrication accessibility for the taper pin roller bearing which includes the races 112 and 113.

Housing tube 114, Fig. 5, will accordingly be understood to constitute a transverse supporting beam for the principal driving shaft 109 and to be held against rotation in a nesting which includes a pair of yoke channels 125 which are located under each of the longitudinally extending angle bars 126 and 127 between which is held an underbent flange of the side frames 128 and 129. The tubular housing 114 may be apertured as at 131 and as at 132, Fig. 11, for receiving alignment pins 133 and 134 welded or riveted respectively to the yokes 125 and to the yoke straps 135.

The wagon body is principally supported on the rolling wheels 104 of which there are two as has already been explained and the rolling motion incident to drawing the vehicle imparts through the wheel axle 109 the power which is required to operate the various beater and distributor accessories. The location of axle 109 with respect to the weight distribution of the vehicle is such that a significant preponderance prevails at the rearward end of the unit (see particularly Fig. 1).

While the present invention has been explained and described with reference to a specific contemplation of embodiment, it will be understood, nevertheless, that numerous variations and modifications are susceptible of incorporation before departing from the essential spirit or scope thereof. Accordingly, it is not intended to be limited by the terminology of the foregoing specification or the details in the accompanying drawings except as indicated on the hereunto appended claims.

I claim:

1. Bearing and drive means for a vehicle comprising a tubular housing adapted to be secured to the body of said vehicle, an axle extending through said housing with predetermined lengths of protrusion at opposite ends, a tapered roller bearing assembly at each end of said housing and having its outer race ring drive-fitted therein and its inner race ring frictionally seated upon said axle in operative relation to said outer race ring to receive therebetween a plurality of tapered rollers, a sleeve keyed to each end of said axle and having a portion fitting said predetermined length of axle protrusion and shouldering against the respective inner race ring, said sleeve having other portions overlying and journalled upon a respective end of said tubular housing, a wheel journalled on said sleeve, clutch means effecting driving engagement between said sleeve and said wheel, and means including a nut threaded upon each outermost end of said axle for critically adjusting the axial disposition of said sleeve and therethrough the disposition of the inner ring of said bearing assembly to take up wear therein.

2. Bearing and drive means for a vehicle comprising a tubular housing adapted to be secured to the body of said vehicle, an axle extending through said housing with predetermined lengths of protrusion at opposite ends, a tapered roller bearing assembly at each end of said housing and having its outer race ring drive-fitted therein and its inner race ring frictionally seated upon said axle in operative relation of tapered rollers, a sleeve keyed to each end of said axle and having a portion fitting said predetermined length of axle protrusion and shouldering against the respective inner race ring, said sleeve having other portions overlying and journalled upon a respective end of said tubular housing, a wheel journalled on said sleeve, clutch means effecting driving engagement between said sleeve and said wheel, power take-off means connected at least to one of said sleeves whereby rolling motion of one of said wheels is translated to said power take-off means.

3. Bearing and drive means for a vehicle comprising a tubular housing adapted to be secured to the body of said vehicle, an axle extending through said housing with a predetermined length of protrusion at least at one end thereof, a tapered roller bearing assembly at said end of said housing and having its outer race ring drive-fitted therein and its inner race ring frictionally seated upon said axle in operative relation to said outer race ring to receive therebetween a plurality of tapered rollers, a sleeve keyed to the protruding end of said axle and shouldering against the respective inner race ring, said sleeve having a portion overlying and journalled upon a respective end of said tubular housing, a wheel journalled on said sleeve, clutch means effecting driving engagement between said sleeve and said wheel and means including a nut threaded upon the outermost end of said axle protrusion for critically adjusting the axial disposition of said sleeve and therethrough the disposition of the inner ring of said bearing assembly to take up wear thereof.

References Cited in the file of this patent

UNITED STATES PATENTS

| Number | Name | Date |
|---|---|---|
| 517,235 | Pettit | Mar. 27, 1894 |
| 1,659,858 | Cooper | Feb. 21, 1928 |
| 1,790,730 | Synck | Feb. 3, 1931 |
| 2,066,862 | Synck | Jan. 5, 1937 |
| 2,343,303 | Kuhlman | Mar. 7, 1944 |
| 2,486,214 | Seaholm | Oct. 25, 1949 |
| 2,496,162 | Hurt | Jan. 31, 1950 |